INVENTORS
GEORGE FRED DRIEMEYER,
JAMES C. TRAVILLA AND ROBERT E. STEIN
BY Francis Travers Burgess
ATTORNEY Oct. 13, 1959 G. F. DRIEMEYER ET AL 2,908,231
RAILWAY VEHICLE STRUCTURE
Filed Nov. 26, 1956 3 Sheets-Sheet 3

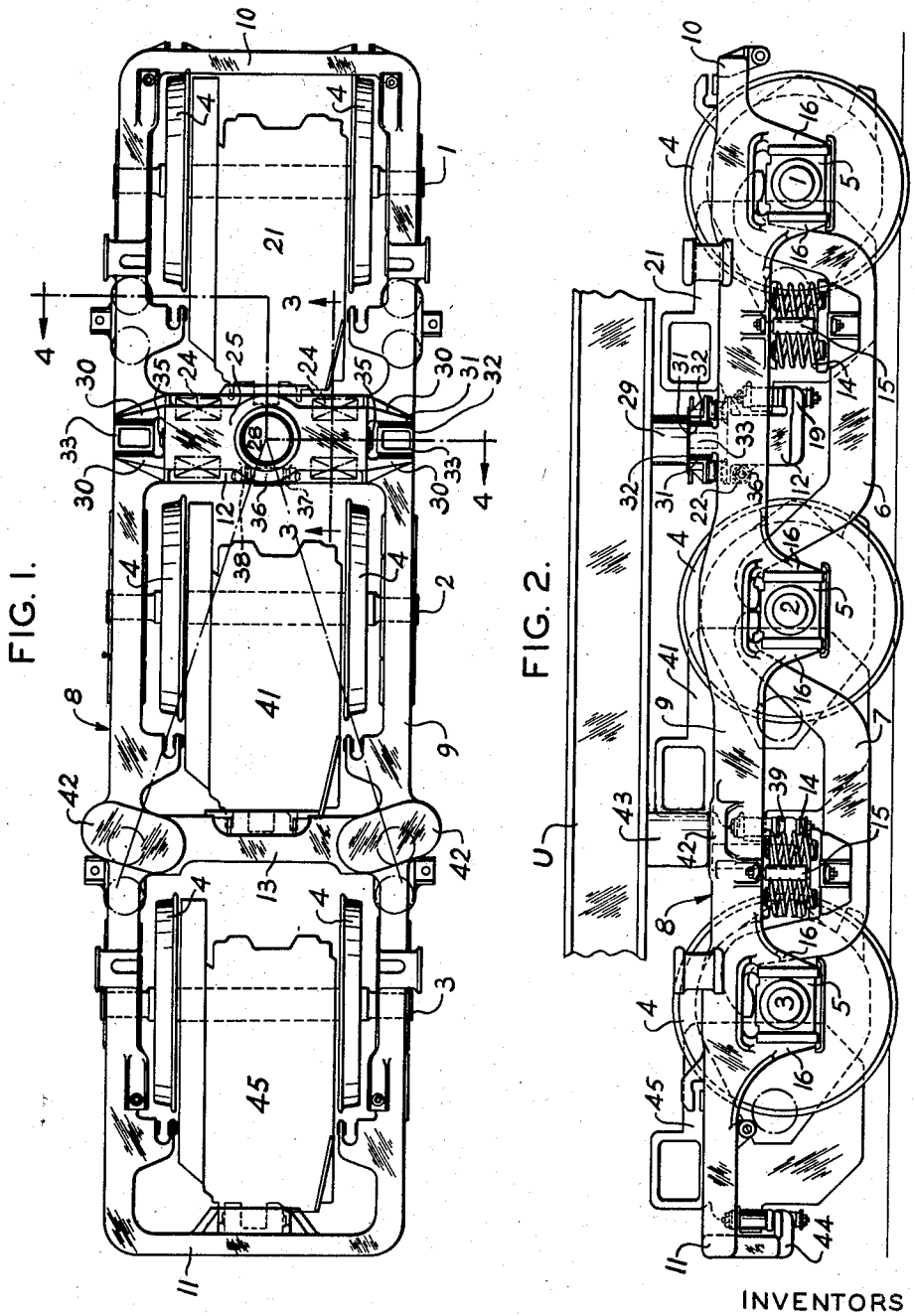

INVENTORS
GEORGE FRED DRIEMEYER,
JAMES C. TRAVILLA
AND ROBERT E. STEIN

BY
Francis Travers Burgess
ATTORNEY

United States Patent Office 2,908,231
Patented Oct. 13, 1959

2,908,231

RAILWAY VEHICLE STRUCTURE

George Fred Driemeyer, Clayton, and James C. Travilla, La Due, Mo., and Robert E. Stein, Dorsey, Ill., assignors to General Steel Castings Corporation, Granite City, Ill., a corporation of Delaware Application November 26, 1956, Serial No. 624,251

1 Claim. (Cl. 105—196)

The invention relates to railway vehicle structures and consists particularly in a six-wheel three-motor truck in which the motors all face in the same direction longitudinally of the truck and in which the body is supported by a center plate and a pair of bearings spaced transversely of the truck from each other and longitudinally of the truck from the center plate.

In the usual three-motor six-wheel truck having one or more intermediate transoms between each end axle and the middle axle, the motors are arranged so that their noses are supported by the intermediate transoms; that is, the motors on the middle axle and one of the end axles are supported by the transoms between those axles, and the motor on the other end axle is supported on the transom between that axle and the middle axle. Consequently the motor on the first-mentioned end axle faces in a direction longitudinally of the truck opposite that of the motor on the middle axle and second-mentioned end axle.

It is advantageous to have each of the motors facing in the same direction, but in the usual truck, in which the body is supported on a center plate at or near its longitudinal center, it is difficult to prevent tilting of the truck longitudinally. The reason for this is that, during operation of the motors, the motors will each apply a vertical force to their respective supporting transoms tending to move the transom upwardly or downwardly depending upon the direction of rotation of the motor. Since the forces applied to the intermediate transoms by the end motor and middle motor mounted thereon, respectively, are approximately equidistant from the center plate in opposite directions longitudinally of the truck, they do not interfere with the stability of the truck. However, the force applied by the second end axle motor to the end transom on which it is mounted will cause torque of considerable magnitude at the center plate tending to rotate the entire truck frame about a transverse axis through the center plate, by virtue of the long arm between the center plate and the end transom.

It is accordingly an object of the invention to provide a longitudinally stable truck of the type in which the motors are all arranged in the same direction.

It is a further object to provide such a truck in which the vehicle body is laterally movable relative to the truck frame.

We achieve the foregoing objects by providing a rigid frame truck with a center plate supporting bolster mounted on the frame between the middle axle and an end axle for lateral motion only, and providing, on the frame between the middle axle and the opposite end axle, a pair of transversely spaced sliding bearing members for engagement with co-operating members depending from the vehicle body. In order to provide lateral movement of the bolster, without any substantial vertical movement, since the latter would interfere with the longitudinal stability of the truck frame, the bolster is supported from the frame by rubber pads.

It is a further object of the invention to provide a novel arrangement for supporting the bolster.

In the accompanying drawings in which selected embodiments of the invention are illustrated:

Figure 1 is a top view of a six wheel motor truck embodying the invention.

Figure 2 is a side elevation of the truck shown in Figure 1.

Figure 3:
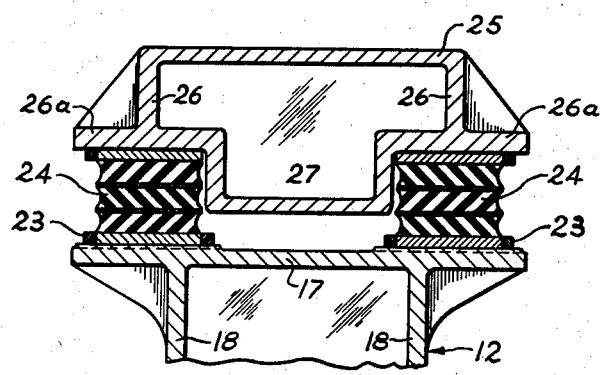
Figure 3 is a fragmentary longitudinal vertical sectional view of the truck along the line 3—3 of Figure 1.
Figure 4:
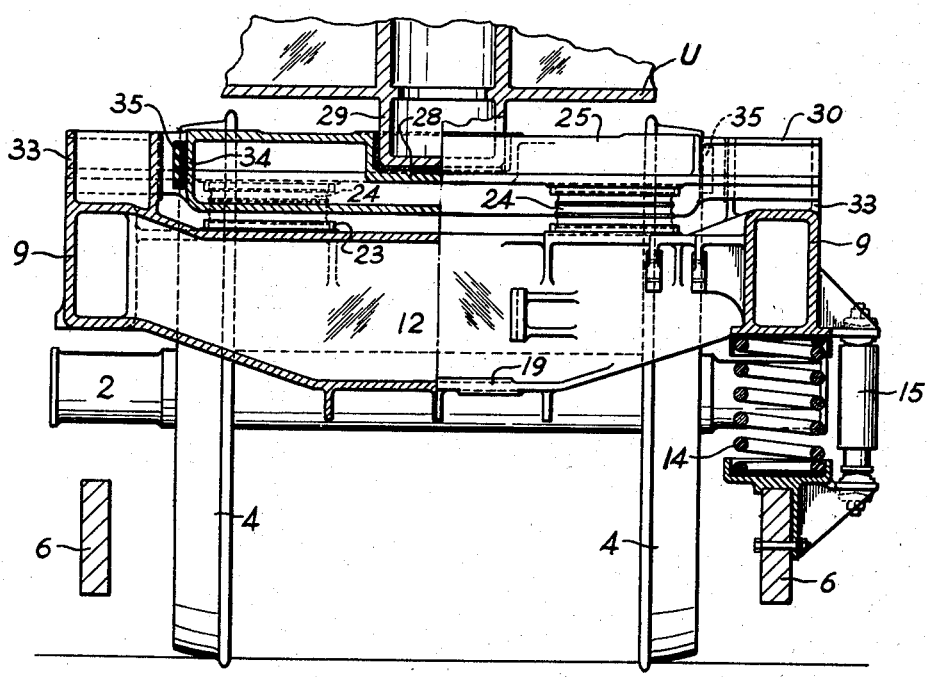
Figure 4 is a transverse vertical sectional view of the truck along the line 4—4 of Figure 1.

The truck includes three wheel and axle assemblies comprising axles 1, 2 and 3, and wheels 4. The usual journal boxes 5, rotatably mounted at the ends of each of the axles, support longitudinally extending drop equalizers 6 and 7, extending respectively between axles 1 and 2, and 2 and 3.

An integral cast steel frame 8 consisting of longitudinal wheel pieces 9, transverse end transoms 10 and 11, and transverse intermediate transoms 12 and 13, is resiliently supported on equalizers 6 and 7 by coil spring units 14. Friction snubbers 15 are connected to the frame and equalizers adjacent the spring locations to damp oscillations of the coil springs.

Adjacent the axle locations, wheel pieces 9 are provided with pairs of longitudinally spaced depending pedestal legs 16 between which are slidably received journal boxes 5.

Intermediate transom 12 is of box section and is formed with a flat upper wall 17 extending outwardly longitudinally of the truck from its vertical side walls 18. At its lower end transom 12 is provided with bracket 19 upon which is resiliently supported the nose of traction motor 21 associated with axle 1. The upper wall 17 of transom 12, as indicated above, is wider in a direction longitudinally of the truck than the lower portion of the transom, so as to provide the maximum base longitudinally of the truck for the members supporting the bolster, while at the same time providing clearance adjacent the lower portion of the transom for the motor nose and brake hangers (not shown), which are supported from the transom by brackets 22.

Near its connections to the wheel pieces, the top wall of the transom is provided with four rectangular bosses upstandingly flanged on their peripheries as at 23 and on these are seated rubber sandwiches 24 comprising alternate layers of metal plates and rubber pads bonded to each other. A transversely extending bolster 25, the intermediate portion of which is of hollow T cross section, is supported on sandwiches 24, the lower surfaces of its arms 26, as extended by flanges 26a, resting on top of the sandwiches, and its depending middle section 27 extending downwardly between the sandwiches so as to provide a section of sufficient depth to carry the required load while at the same time having the lowest possible over-all height. The sandwiches 24 are compressed between the bolster and transom and cushion vertical shocks without providing for substantial vertical movement of the bolster; the sandwiches 24 are adapted, however, to yield substantially in shear to accommodate movements of the bolster transversely of the truck; the elasticity of the sandwiches tends to center the bolster when lateral forces are spent. Bolster 25 is formed with the usual center plate 28 for pivotally supporting the vehicle body underframe U through a co-operating body center plate 29.

To accommodate transverse movement of the bolster relative to the frame, while at the same time preventing any substantial movement of the bolster ends longitudinally of the frame the ends of the bolster are bifurcated as at 30, the inner vertical walls of the bifurcations being provided with wear plates 31 adapted to slidably engage co-operating wear plates 32 on upstanding wheel piece abutments 33 interposed between the bolster bifurcations 30. The end walls 34 of the bolster, between the bifurcations, are normally spaced inwardly of the truck from the inner wall of the wheel piece abutments 33 so as to permit such movements of the bolster transversely of the truck as will be accommodated by shear in rubber sandwiches 24. To cushion such transverse movements and to prevent metal to metal contact, flat rubber pads 35 are secured to the end walls 34 for engagement with the inner walls of wheel piece abutments 33 when the maximum desired transverse movement occurs. Transverse oscillations of the bolster are damped by a horizontal friction snubbing device 36, which is secured at one end to a bracket 37 on the bolster and at the other end to a similar bracket 38 on the frame.

Intermediate transom 13 is provided with a swing link supported element 39 for supporting the nose of the intermediate motor 41 associated with axle 2. At the intersections between transom 13 and wheel pieces 8 horizontal bearing surfaces 42, elongated along tangents to an arc concentric with center plate 28, are formed on the frame. Depending bosses 43 on underframe U are normally in slidable engagement with bearings 42 so as to transmit a portion of the body load directly to the wheel pieces at these points, the remainder of the body load being transmitted to the truck frame through the center plates 28, 29, bolster 25, and rubber sandwiches 24.

End transom 11, adjacent axle 3, is formed with bracket 44 for supporting the nose of motor 45 associated with axle 3.

In operation it will be noted that any tendency of the truck to rotate about a transverse horizontal axis because of the torque applied to the frame by motor 45 through end transom 11, will be resisted by the body load acting on the frame through the long arm longitudinally of the truck formed by the longitudinal spacing of the center plate 28 and the bearings 42, 43.

Figure 5:
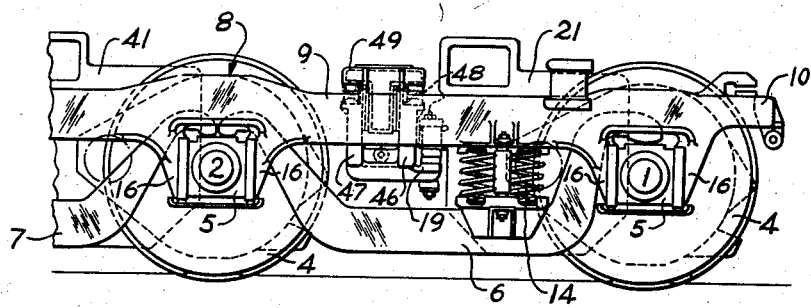
Figure 5 is a fragmentary side elevation view of a truck similar to that shown in Figures 1 to 4, but illustrating a modified form of bolster and adjacent portions of the framing.
Figure 7:
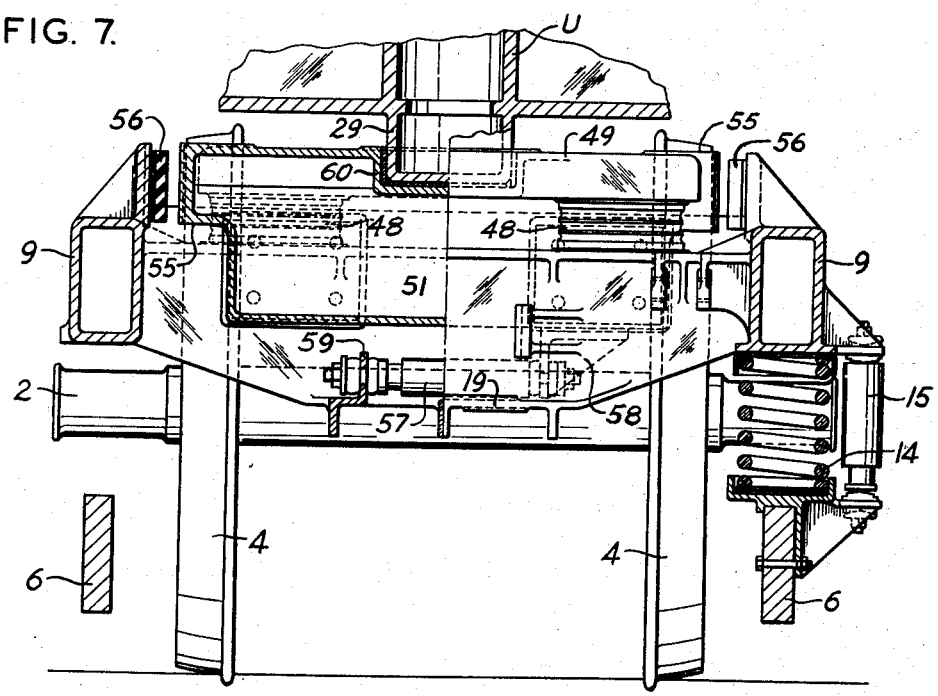
Figure 7 is a transverse vertical sectional view, similar to Figure 4, of the structure shown in Figure 5.
Figure 6:
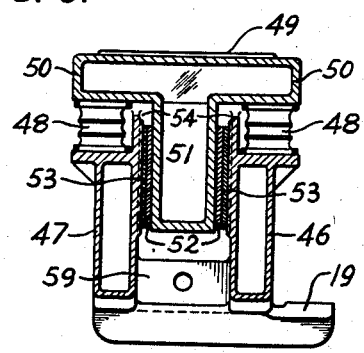
Figure 6 is a longitudinal vertical sectional view, similar to Figure 3, of the structure shown in Figure 5.

Figures 5 to 7 illustrate a modification of the bolster and bolster-supporting portion of the truck. In this modification, intermediate transom 12 is replaced by a pair of intermediate transoms 46 and 47. Near their ends transoms 46 and 47 are provided with seats on their upper surfaces for rubber sandwiches 48, and a bolster 49 of hollow T cross section is supported on sandwiches 48, the horizontal arms 50 of the T resting directly on the sandwiches with the depending portion 51 of the T extending downwardly between the adjacent transoms 46 and 47. The side walls of depending portion 51 are provided near their ends with wear plates 52 which are in slidable engagement with co-operating wear plates 53 on the inner adjacent walls, respectively, of transoms 46 and 47, which are extended upwardly at the wear plate locations as at 54 so as to accommodate wear plates of greater height. The middle section of the bolster projects transversely of the truck as at 55 and is somewhat shorter than the distance between the inner walls of the wheel pieces at this point so as to permit such movement of the bolster transversely of the truck as may be accommodated by rubber sandwiches 48. The usual rubber bumpers 56 are applied to the inner walls of the wheel pieces adjacent the bolster ends to cushion lateral movements of the bolster. To damp transverse movements of the bolster relative to the frame, a transversely extending friction snubbing device 57 is secured at one end to a bracket 58 depending from the bolster and at the other end to a bracket 59 extending between transoms 46 and 47. Bolster 49 is formed with a center plate 60 for pivotally supporting body underframe U through a co-operating body center plate 29.

The details of the construction may be varied substantially without departing from the spirit of the invention and the exclusive use of those modifications coming within the scope of the appended claim is contemplated.

What is claimed is:

In a railway vehicle truck, three wheel and axle assemblies, a frame spring-supported from said assemblies, said frame comprising longitudinally-extending members at each side and transverse transoms rigid with said side members and positioned between the end axles and the middle axle and longitudinally outwardly of an end axle, a traction motor supported from each axle and an adjacent transom, said motors being arranged with their axes parallel to the axles and their points of suspension from the frame in the same direction longitudinally of the truck from all three axles, the transoms between said end axles and the middle axle each having transversely-spaced upwardly facing horizontal surfaces, flat rubber-like pads seated on said surfaces of the transom between the middle axle and one end axle and spaced apart from each other transversely and longitudinally of the truck, said pads being adapted to yield under shear to transversely-applied horizontal forces but resisting substantial vertical deformation, a bolster extending transversely of the truck over the transom between said middle axle and said one end axle and having a relatively wide upper portion and a relatively narrow lower portion, said rubber-like pads underlying engaging said bolster upper portion, said bolster lower portion extending between the longitudinally-spaced rubber-like pads, the ends of the bolster being horizontally bifurcated, upstanding abutments formed on the longitudinally extending frame members and slidably received between the bolster bifurcations to restrain movement of the bolster longitudinally of the truck and accommodate movement of the bolster transversely of the truck, a pivot center plate mounted on said bolster and being adapted to pivotally engage a mating element rigid with a supported vehicle body, said horizontal surfaces on the transom between the middle axle and the other end axle having their major axes tangent to an arc concentric with the center of said center plate and being adapted to slidably engage elements rigid with the supported vehicle body.

References Cited in the file of this patent

UNITED STATES PATENTS

| 650,511 | Mansfield | May 29, 1900 |
|---|---|---|
| 1,536,137 | Priebe | May 5, 1925 |
| 1,587,286 | Dalman | June 1, 1926 |
| 1,630,574 | Kadel | May 31, 1927 |
| 1,895,500 | Todd | Jan. 31, 1933 |
| 2,317,398 | Nystrom et al. | Apr. 27, 1943 |
| 2,466,088 | Endsley | Apr. 5, 1949 |
| 2,492,337 | Travilla | Dec. 27, 1949 |
| 2,496,644 | Travilla | Feb. 7, 1950 |
| 2,517,671 | Jackson | Aug. 8, 1950 |
| 2,610,586 | Alben | Sept. 16, 1952 |
| 2,703,057 | Wintemberg | Mar. 1, 1955 |
| 2,740,359 | Travilla | Apr. 3, 1956 |
| 2,773,456 | Crabtree | Dec. 11, 1956 |
| 2,777,401 | Rossell | Jan. 15, 1957 |
| 2,797,649 | Ross et al. | July 2, 1957 |
| 2,797,650 | Ross et al. | July 2, 1957 |
| 2,819,685 | Podgajny | Jan. 14, 1958 |

FOREIGN PATENTS

| 944,379 | Germany | June 14, 1956 |